United States Patent [19]
Sakamoto

[11] Patent Number: 5,134,326
[45] Date of Patent: Jul. 28, 1992

[54] VOICE COIL TYPE ACTUATOR

[76] Inventor: Satoshi Sakamoto, c/o Sony Corporation 7-35, Kitashinagawa 6-Chome, Shinagawa-ku, Tokyo, Japan

[21] Appl. No.: 705,491
[22] Filed: May 24, 1991

[30] Foreign Application Priority Data
May 25, 1990 [JP] Japan .................................. 1-35993
Dec. 25, 1990 [JP] Japan .................................. 412983

[51] Int. Cl.$^5$ .......................... H02K 41/00; G03B 1/18
[52] U.S. Cl. .......................................... 310/14; 310/12; 354/195.1
[58] Field of Search ............................ 310/13, 14, 12; 354/195.1, 195.12, 400

[56] References Cited

U.S. PATENT DOCUMENTS

| 4,692,999 | 9/1987 | Frandsen | 29/596 |
| 4,828,360 | 5/1989 | Maruyama | 350/255 |

FOREIGN PATENT DOCUMENTS 470890 8/1975 U.S.S.R. ................................. 310/13

Primary Examiner—Steven L. Stephan
Assistant Examiner—Judson H. Jones
Attorney, Agent, or Firm—Hill, Van Santen, Steadman & Simpson

[57] ABSTRACT

A voice coil type actuator wherein the length in an axial direction and the number of parts is reduced without deteriorating a required function and the magnetic flux density in a space in which a movable coil is located is substantially uniform over the entire length in an axial direction. The voice coil type actuator comprises a fixed guide shaft having a radial portion made of a permeable material and a movable body supported for axial sliding movement on the guide shaft. The movable coil is supported coaxially with the guide shaft on the movable body. A yoke having a substantially cylindrical profile is disposed in such a manner as to surround a range of movement of the movable coil, and a pair of fixed magnets are disposed in contact with the guide shaft and the yoke and magnetized with the opposite polarities in a radial direction. The yoke has a recess formed therein in the axial direction of the yoke, and a movable member to be moved by the actuator is supported at a portion of the movable body which extends laterally through the recess in the yoke.

8 Claims, 7 Drawing Sheets

VOICE COIL TYPE ACTUATOR

BACKGROUND OF THE INVENTION

1. Field of the Invention

This invention relates generally to a voice coil type actuator, and more particularly to a voice coil type actuator wherein a movable body having a movable coil supported thereon, a guide shaft having the movable body supported for sliding movement thereon and an outside yoke and an inside yoke for defining a closed magnetic path along which a magnetic flux produced from a magnet passes are disposed in a coaxial relationship with each other and a movable member located on the outer side of the outside yoke is connected to the movable body such that the movable body is moved by a moving force exerted by the movable coil.

2. Description of the Prior Art

An exemplary drive for moving a movable member along a linear passage such as, for example, for moving a movable lens in a lens system of a camera or for moving a recording and reproducing head of a disk type recording and reproducing apparatus is a voice coil type actuator or drive.

An actuator of the type mentioned is normally constructed such that a movable body which has a movable coil supported thereon is in turn supported for sliding movement on a guide shaft or the like and a magnetic field forming element including a magnet and a yoke held in contact with each other is disposed such that an annular space in which the movable coil is located is formed therein. A closed magnetic path in which magnetic fluxes pass the movable coil in a direction perpendicular to an axial direction of the movable coil is formed, and further, the movable body and a movable member are connected to each other such that the movable member is moved by a moving force exerted by the movable coil.

An example of a conventional voice coil actuator having such construction is disclosed in Japanese Patent Laid-Open Application NO. 1-196011 and is shown in FIG. 7 of the present application.

Referring to FIG. 7, the actuator, which is generally denoted at a, includes a housing b secured to a lens barrel c. A pair of bearings d are secured to the opposite forward and rearward end portions of the housing b, and a sliding shaft e is supported by the bearings d at the opposite end portions thereof for sliding movement in an axial direction thereof. A yoke body f is secured to the housing b in a coaxial relationship with the sliding shaft e. The yoke body f has an outside yoke portion g of a cylindrical shape and a front wall portion h which closes an end face of the cylindrical outside yoke portion g. A magnet i is mounted in a coaxial relationship with the outside yoke portion g. The magnet i is substantially ring shaped and is magnetized so that the opposite polarities are in the axial direction. An inside yoke j also having a substantially ring-shaped profile is mounted on a rear face of the magnet i, and a closed magnetic path along which magnetic fluxes produced by the magnet i pass is formed by the yoke body f, the magnet i and the inside yoke j. The path of the magnetic fluxes is indicated by a broken line arrow in FIG. 7.

A movable body k of the conventional actuator has a main portion 1 having a substantially disk-like profile, a hub portion m extending forwardly from a central portion of the main portion 1, and a coil bobbin n of a cylindrical shape which extends forwardly from an outer periphery of the main portion 1. The hub portion m of the movable body k is fitted around and secured to the sliding shaft e, and a movable coil o is wound on an outer periphery of the coil bobbin n. The movable coil o is positioned in an annular space defined by the inside yoke i and the outside yoke portion g of the yoke body f, and accordingly, magnetic fluxes from the magnet i flow through the movable coil in a direction perpendicular to an axial direction of the movable coil o. A lens holding member p has a lens holding portion q of a substantially cylindrical shape and a connecting portion s extending from a rear end portion of an outer periphery of the lens holding portion q. The lens holding member p is secured at the connecting portion s thereof to a face of the main portion 1 of the movable body k remote from the inside yoke j, and a movable lens r is held by the lens holding portion q of the lens holding member p.

When a driving electric current is supplied to the movable coil o, a moving force is exerted on the movable coil o in a direction corresponding to the direction of the driving electric current, and the movable body k and the sliding shaft e and the lens holding member p are moved integrally by the moving force.

The voice coil type actuator a described above if subject to the following problems.

In particular, since interconnection between the movable body k on which the movable coil o is supported and the lens holding member p and the movable lens r which serve as a movable member is at a position spaced from the movable coil o in the axial direction, there is a problem that the dimension L required for establishing such an interconnection increases the size of the actuator a in the axial direction.

Further, since the conventional actuator a employs parts for exclusive use each having a single function for the two inner and outer yokes, the magnet, the guide shaft and so forth which are essential elements to form a magnetic field having a closed magnetic path, there is a problem that it is difficult to reduce the number of parts without deteriorating any of their functions.

Furthermore, since the space defined by the outside yoke portion g of the yoke body f and the inside yoke j at least has a length equal to a range of movement of the movable coil o, the magnetic flux density in the space increases toward the magnet i and is not uniform, and accordingly, there is a problem that, as the range of movement of the movable coil o, or in other words, the range of movement of the movable member, increases, movement of the movable coil o likely becomes unstable as such.

Besides, while the front face portion h of the yoke body f is formed of a comparatively small thickness to make the size of the actuator a in the axial direction as small as possible, if the thickness of the front face portion h is too small, then saturation of magnetic fluxes takes place here, and after all, there is a problem that it causes a reduction in the magnetic flux density in the space described above.

SUMMARY OF THE INVENTION

It is an object of the present invention to provide a voice coil type actuator wherein the length in an axial direction and the number of parts is reduced without deteriorating any of the required functions.

It is another object of the present invention to provided a voice coil type actuator wherein the magnetic flux density in a space in which a movable coil is located is made substantially uniform over the entire length in an axial direction while the size in a direction perpendicular to the direction of movement of the movable body is reduced.

To attain these and other objects and advantages, according to the present invention there is provided a voice coil type actuator for linearly moving a movable member, which comprises a fixed guide shaft wherein the entirety of or part of its cross section in a radial direction is made of a material having permeability, a movable body supported for axial sliding movement on the guide shaft, a movable coil supported in a coaxial relationship with the guide shaft on the movable body, a yoke of a substantially cylindrical shape and surrounding a range of movement of the movable coil, and a pair of fixed magnets disposed adjacent the opposite end portions of the guide shaft in contact with the guide shaft and the yoke. The magnets are magnetized with their opposite polarities arranged in a direction perpendicular to the axis of the movable coil, and the yoke has a recess formed therein extending in the axial direction of the yoke, and the movable member is supported at a portion of the movable body which extends laterally through the recess in the yoke.

With the voice coil type actuator, since a portion at which a part of the movable body that is supported on the guide shaft and another portion of the movable body at which the movable member is supported are connected to each other can be extended from the potion supported on the guide shaft in the direction perpendicular to the movable direction of the movable body, the length required for disposing the extended portion of the movable body therein need not be included in the length of the actuator in the axial direction, and the dimension of the actuator in the axial direction can be reduced as much. Further, since the guide shaft for supporting the movable body thereon also functions as an inside yoke, an inside yoke as a special part is unnecessary, and consequently, the number of parts is reduced. Furthermore, since the magnets for generating a magnetic field are disposed at two locations opposed individually to the opposite ends of the range of movement of the movable coil and interconnect the yoke and the guide shaft to each other there, the magnetic flux density in the space in which the movable coil is moved is made substantially uniform over the entire length of the space, and consequently, movement of the movable coil is stable at any position in the range of movement of the movable coil. Further, since a closed magnetic path is formed such that it divides the range of movement of the movable coil into two portions in the direction of movement of the movable coil, even if the thickness of the yoke is reduced and/or even if the diameter of the permeable portion of the guide shaft is reduced, saturation with magnetic fluxes does not take place readily at any of those portions. Also in this regard, the magnitude of the movable coil in a direction perpendicular to the direction of movement thereof can be reduced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Referring first to FIGS. 1 through 4, there is shown a voice coil type actuator in which the principles of the present invention are applied. The illustrated voice coil type actuator is incorporated in a lens system of a camera for moving a movable lens of the lens system, although other applications of voice coil actuators are, of course, possible.

Figure 1:
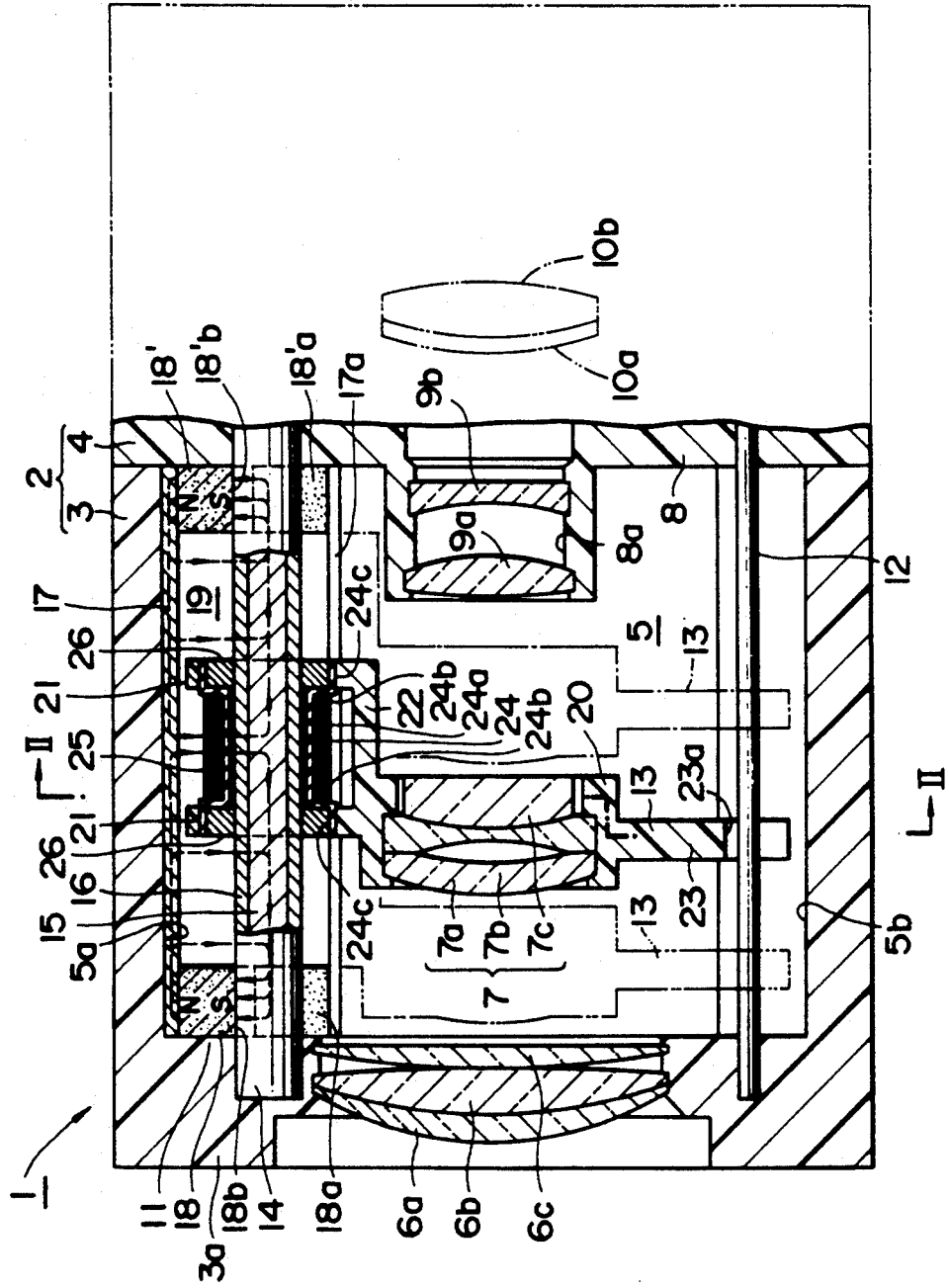
FIG. 1 is an axial vertical sectional view of a lens barrel for a lens system of a camera in which a voice coil type actuator according to the present invention is incorporated as an actuator for moving a movable lens for zooming the lens system.
Figure 2:
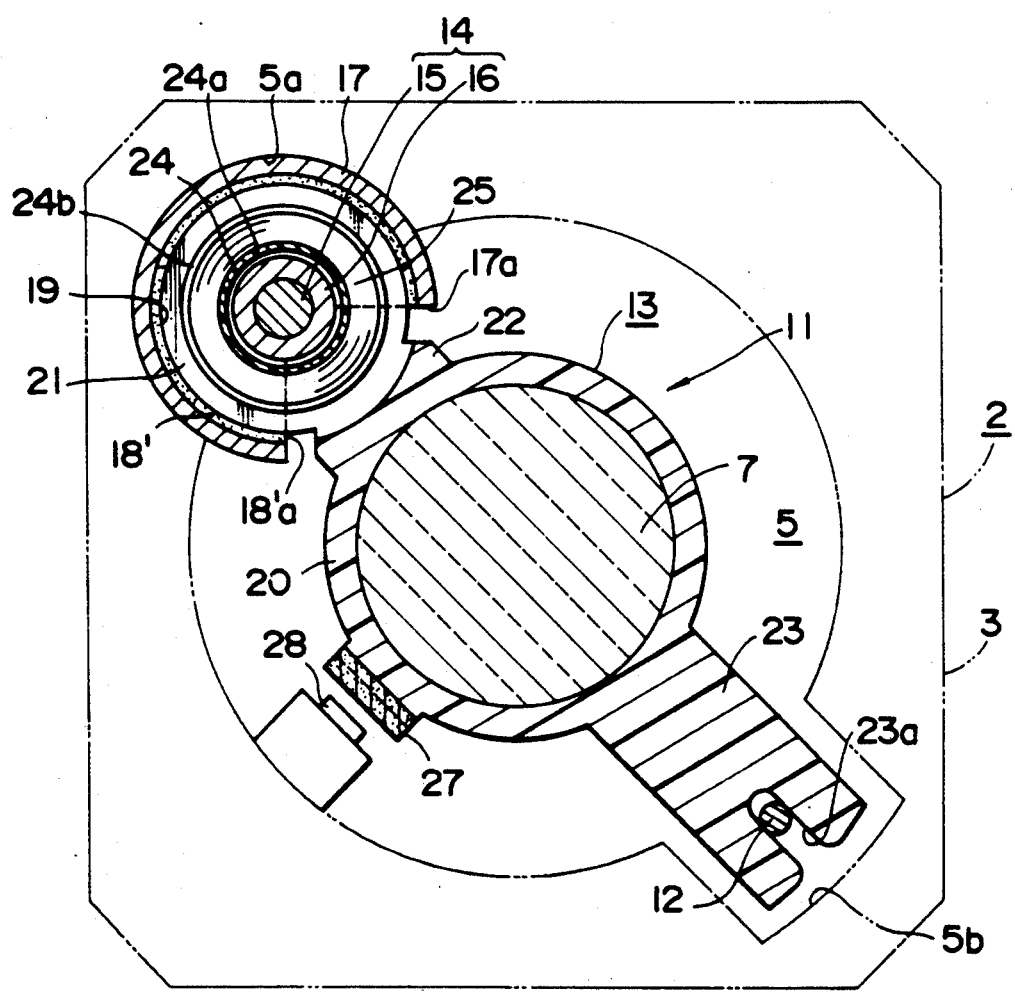
FIG. 2 is a sectional view taken along line II—II of FIG. 1.
Figure 3:
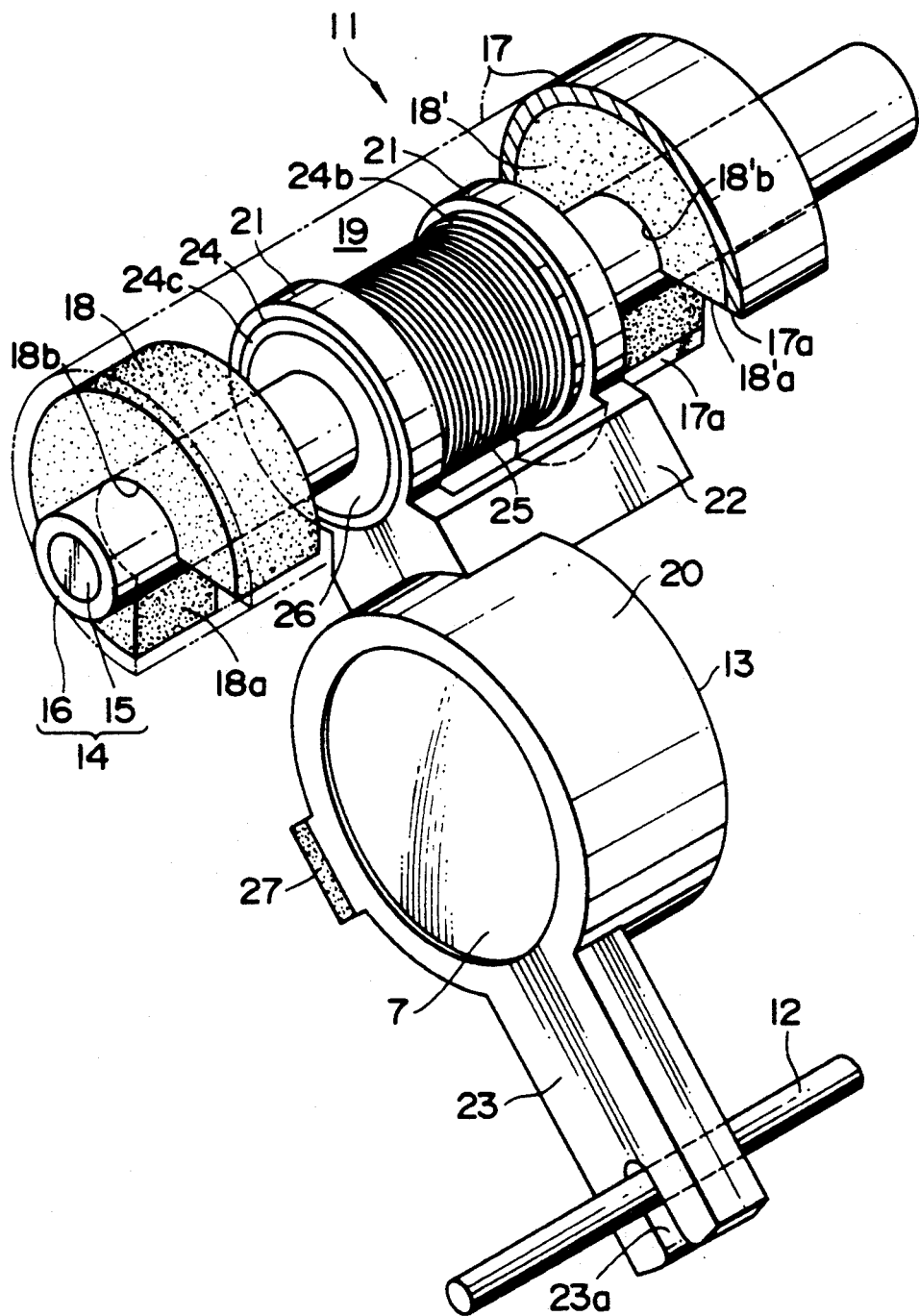
FIG. 3 is an enlarged perspective view, partly broken, of the voice coil type actuator of FIG. 1.
Figure 4:
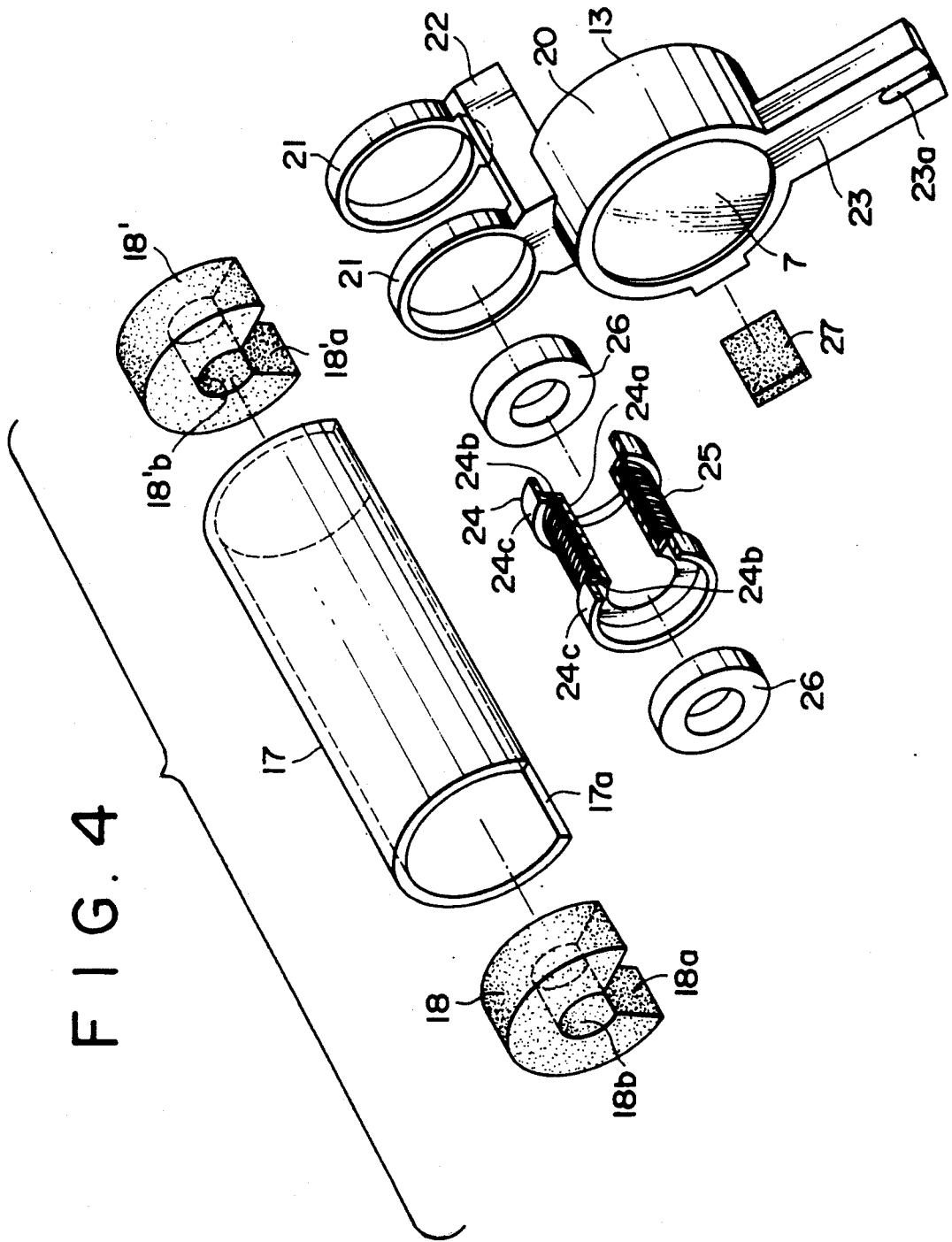
FIG. 4 is a fragmentary perspective view of the voice coil actuator of FIG. 3.

In further detail, the voice coil type actuator is mounted in a lens barrel 1 of a camera. The lens barrel 1 has an outer shell 2 which is formed with an outer profile having a substantially prism-like shape and is made up of an outer shell front half portion 3 coupled to an outer shell rear half portion 4 (only the front end portion of which is shown in FIG. 1). An inner space 5 is formed in the outer shell front half portion 3 of the outer shell 2. The inner space 5 has a substantially circular cross section that is open at the opposite front and rear ends thereof. Another space which is substantially similar to the inner space 5 is formed also in the outer shell rear half portion 4.

A plurality of lenses 6a, 6b, 7a, 7b and 7c each having a predetermined light controlling action are disposed in the inner space 5; a pair of lenses 8a and 8b are disposed in a light passing hole 8a formed in an intermediate wall 8 which makes a front end portion of the outer shell rear half portion 4: and another pair of lenses 10a and 10b are disposed in an inner space (which is shown only schematically) in the outer shell rear half portion 4. The lenses 6a, 6b, 7a, 7b, 7c, 8a, 8b, 10a and 10b are disposed along a common optical axis, and a lens set 7 consisting of the lenses 7a, 7b and 7c serves as a movable lens for the zooming action of the lens.

A pair of spaces 5a and 5b, each in the form of a recessed groove, are formed at diametrical locations on an inner wall of the outer shell front half portion 3 of the outer shell 2 contiguously to the inner space 5 and extending in the forward and backward directions of the lens barrel 1. The space 5a is provided to receive a voice coil type actuator 11 therein and has a cross section of a substantially C-shape, while the other space 5b is provided to receive therein a guide portion mentioned hereinbelow and has a cross section of a substantially channel-shape. Most parts of the voice coil type actuator 11 are disposed in the actuator space 5a while an auxiliary guide shaft 12 having a substantially column-like profile is disposed in the space 5b. The auxiliary guide shaft 12 is supported at the opposite front and rear ends thereof on the outer shell 2 such that it extends in the forward and backward directions.

A movable body 13 is supported for sliding movement in the forward and backward directions on the auxiliary guide shaft 12 and on a guide shaft 14 of the actuator 11. The movable body 13 is moved by the actuator 11, and the movable lens 7 is held on the movable body 13. The movable body 13 is adapted to move between the position indicated by an alternate long and two short dashes line in FIG. 1 and another position indicated by an alternate long and short dashes line.

The actuator 11 comprises the movable body 13 and the guide shaft 14 mentioned hereinabove, a movable coil 25 supported on the movable body 13, an outside yoke 17 disposed in such a manner as to surround the range of movement of the movable coil, two magnets 18 and 18' disposed in an individually opposing relationship to the opposite ends of the range of movement of the movable coil 25, and so forth.

The guide shaft 14 has a yoke portion 15 of a substantially column-like profile and a guide portion 16 of a substantially cylindrical profile. The yoke portion 15 of the guide shaft 14 is made of a material having a high permeability while the guide portion 16 is made of a metal material having a permeability and having a high slipping performance such as an oil containing metal. The guide portion 16 of the guide shaft 14 is fitted around and coupled to the yoke portion 15.

The guide 14 is disposed at a central portion of the actuator receiving space 5a and extends in the forward and backward directions, that is, parallel to the common optical axis of the lenses 6a, 6b, 6c, 7a, 7b, 7c, 8a, 8b, 10a and 10b. The guide shaft 14 is supported at the opposite ends thereof individually by a front face wall 3a of the outer shell front half portion 3 and the intermediate wall 8 of the outer shell rear half portion 4.

The outside yoke 17 is of a substantially cylindrical shape having a recess, or opening, 17a formed by partly cutting a circumferential wall thereof such that the opening extends over a range of approximately 90 degrees about a central angle from the axis of the outside yoke 17 and over the entire length of the outside yoke 17. Accordingly, the outside yoke 17 is of a substantially C-shape as viewed in the axial direction thereof.

The outside yoke 17 is disposed in the actuator receiving space 5a with the recess 17a thereof directed toward the center of the space 5 and is secured to the outer shell front half portion 3.

The magnets 18 and 18' are each formed in a substantially disk-like shape of a comparatively great thickness which is cut away in a circumferential direction to form a recess or opening 18a or 18'a. The magnets are of an outer diameter equal to an inner diameter of the outside yoke 17. Meanwhile, a hole 18b or 18'b of an inner diameter equal to an outer diameter of the guide shaft 14 is formed at a central portion of each of the magnets 18 and 18', and each of the recesses or openings 18a and 18'a is formed such that it extends from the center to an outer periphery over a range of about 90 degrees about a central angle. Accordingly, each of the magnets 18 and 18' also has a substantially C-shape as viewed in the axial direction.

The magnets 18 and 18' are both magnetized in the same magnetization pattern but with opposite polarities in a radial direction, that is, in a direction perpendicular to the axial direction. It is to be noted that, in FIG. 1, the magnets 18 and 18' are shown magnetized such that each of them has an N (north) pole on the outer peripheral face side and has an S (south) pole on the inner periphery face side thereof.

Outer circumferential faces of the magnets 18 and 18' are securely mounted to the opposite front and rear end portions of the inner peripheral face of the outside yoke 17 in a direction such that the recesses 18a and 18'a thereof coincide with the recess 1-7a of the outside yoke 17 and the inner peripheral faces of the holes 18b and 18'b thereof are contacted by the outer peripheral face of the guide shaft 14.

Thus, a space 19 having a substantially annular cross section is defined by the guide shaft 14 and the outside yoke 17 and two front and rear magnets ;8 and 18' which are mounted to surround the guide shaft 14.

Magnetic fluxes originate from the two magnets 18 and 18' and pass through two closed magnetic paths separately as indicated by broken line arrows in FIG. 1. In particular, magnetic fluxes originating from the front side magnet 18 pass along a closed magnetic path formed by a front half portion of the outside yoke 17—a front half portion of the space 19—and a front half portion of the guide shaft 14—the magnet 18 while magnetic fluxes originating from the rear side magnet 18' pass along another closed magnetic path formed by a rear half portion of the outside yoke 17 —a rear half portion of the space 19—a rear half portion of the guide shaft 14—and the magnet 18'.

The movable body 13 is formed as a unitary member from a synthetic resin material and has a lens holding portion 20 of a substantially cylindrical shape having a comparatively small axial length relative to its diameter, a pair of bearing portions 21 each of a substantially ring-shaped profile and positioned outside the lens holding portion 20 in a coaxial relationship parallel to an axis of the lens holding portion 20, a connecting portion 22 for connecting the two bearing portions 21 to the lens holding portion 20, and a leg portion 23 extending from an outer periphery of the lens holding portion 20 away from the bearing portions 21. The connecting portion 22 of the movable body 13 is a substantially rectangular plate having a width a little smaller than the width of the recess 17a in the outside yoke 17 and elongated in the axial direction of the lens holding portion 20, and a front end portion thereof is connected to a location of the lens holding portion 20 that is remote from the leg portion 23. Meanwhile, the bearing portions 21 have an outer diameter a little smaller than the inner diameter of the outside yoke 17 and are disposed such that they extend from the opposite ends of the connecting portion 22 individually in directions away from the lens holding portion 20. The leg portion 23 of the movable body 13 has a recessed groove 23a formed therein such that an end thereof extends to an end of the leg portion 23.

The movable lens 7 is held on the lens holding portion 20 of the movable body 13.

A coil bobbin 24 is formed as a unitary member of an insulating material and has a coil winding portion 24a of a substantially cylindrical shape, a pair of flange portions 24b extending radially outwardly from the opposite ends of the coil winding portion 24a, and a pair of bearing holding portions 24c each having an annular profile and extending from outer peripheral edges of the flanges 24b in directions away from the coil winding portion 24a. The coil winding portion 24a of the coil bobbin 24 has an inner diameter that is a little greater than the outer diameter of the guide shaft 14.

A movable coil 25 is wound on the coil winding portion 24a of the coil bobbin 24, and a pair of ring shaped metal bearings 26 are force fit in the bearing holding portions 24c of the coil bobbin 24 while the bearing holding portions 24c are, in turn, force fitted in and secured to the bearing portions 21 of the movable body 13. The movable coil 25 is thus supported on the movable body 13.

The guide shaft 14 is fitted for sliding movement in the metal bearings 26, and the recessed groove 23a of the leg portion 23 is engaged for sliding movement with the auxiliary guide shaft 12.

Thus, the movable body 13 is supported for movement in a direction parallel to the optical axis of the movable lens 7 on the auxiliary guide shaft 12, and only the bearing portions 21 thereof are positioned in the space 19 surrounded by the outside yoke 17 while the remaining portion thereof extends outwardly of the space 19 through the recesses 17a, 18a and 18'a formed in the outside yoke 17 and magnets 18 and 18'. The movable lens 7 is held on the lens holding portion 20 which is one of the, thus, extended portions of the movable body 13.

The movable coil 25 is positioned in the space 19 so that the axis of the coil extends in a direction perpendicular to the direction of magnetic fluxes which pass through the space 19.

Thus, if a driving electric current is supplied to the movable coil 25, a moving force is exerted in a direction along the axial direction of the movable coil 25 corresponding to the direction of the driving electric current, and the movable body 13 is moved forwardly or rearwardly by the moving force. Consequently, the movable lens 7 is moved in a direction of the optical axis thereof.

Then, with the voice coil type actuator 11 of the construction described above, since a portion of the movable body 13 which provides interconnection between the bearing portions 21 which are portions of the movable body 13 supported on the guide shaft 14 and the lens holding portion 20 for holding thereon the movable lens 7 which is a movable member of the movable body 13 is positioned outside the actuator 1!, the length of the space necessary for the disposition of such Interconnecting portion need not be included in the length of the actuator 11 in its axial direction, and accordingly, the length of the actuator 11 in that direction is reduced.

Further, the guide shaft 14, at the yoke portion 15 which is a portion nearer to the axis of the guide shaft 14, performs the function of an inside yoke for forming part of a closed magnetic path in the actuator 11, so that there is no necessity to provide a special member as an inside yoke, and accordingly, the number of parts is reduced as much.

Furthermore, since magnetic connection between the outside yoke 17 and the guide shaft 14 are provided individually by the two magnets 18 and 18' at the opposite ends of them, magnetic fluxes from the two magnets 18 and 18' flow individually through the front half portion and the rear half portion of the space 19 in which the movable coil 25 is moved, and consequently, the magnetic flux density in the space 19 is made substantially uniform over the entire length of the space 19 in the axial direction of the guide shaft 14. Meanwhile, since magnetic fluxes pass individual half portions of the yoke 17 and guide shaft 14 separately from each other, saturation with magnetic fluxes will not take place even if the thickness of the yoke 17 and/or the outer diameter of the guide shaft 14 are not increased very much.

A Hall effect element 27 is mounted on the inner peripheral face of the inner space 5 of the outer shell front half portion 3, and an inclination, or inclined, magnet 28 is mounted on a projected portion of an outer periphery of the lens holding portion 20 of the movable body 13. A position detecting means for detecting the position of the movable body 13, thus, comprises the Hall effect element 27 and the inclined magnet 26.

Figure 5:
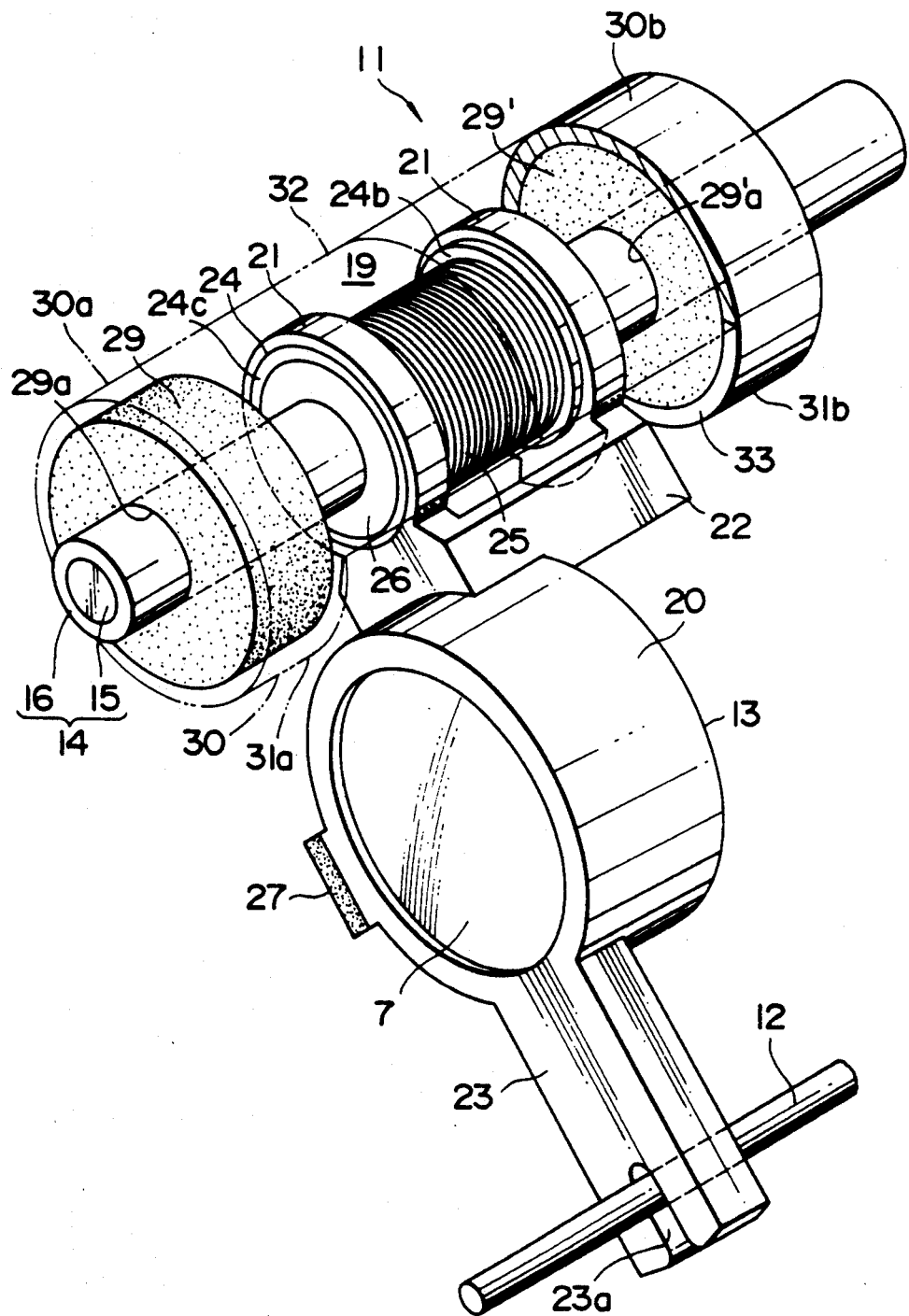
FIG. 5 is an enlarged perspective view, partly broken, of another voice coil type actuator showing a second embodiment of the present invention.
Figure 6:
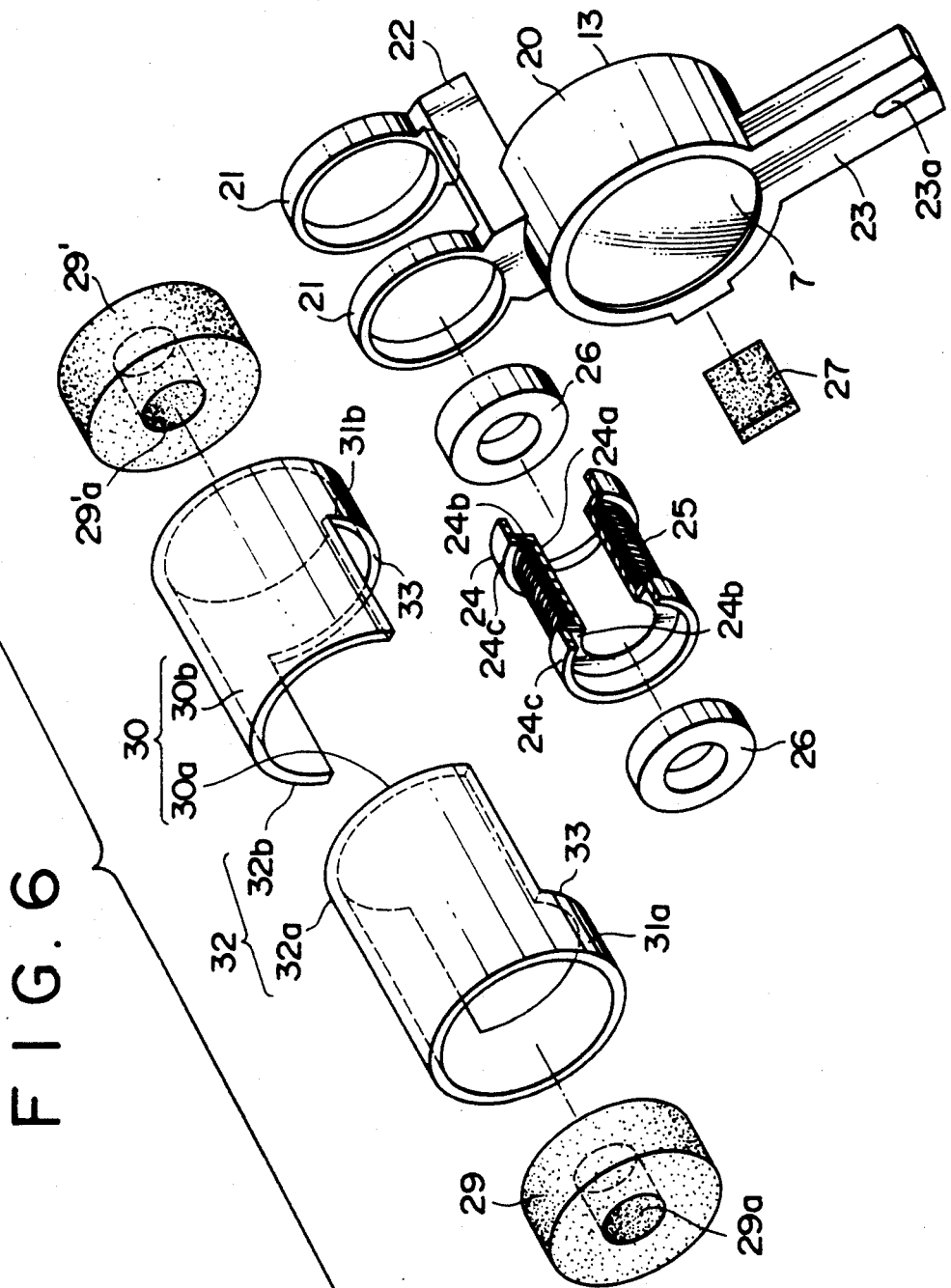
FIG. 6 is a fragmentary perspective view, partly broken, of the voice coil type actuator of FIG. 5.
Figure 7:
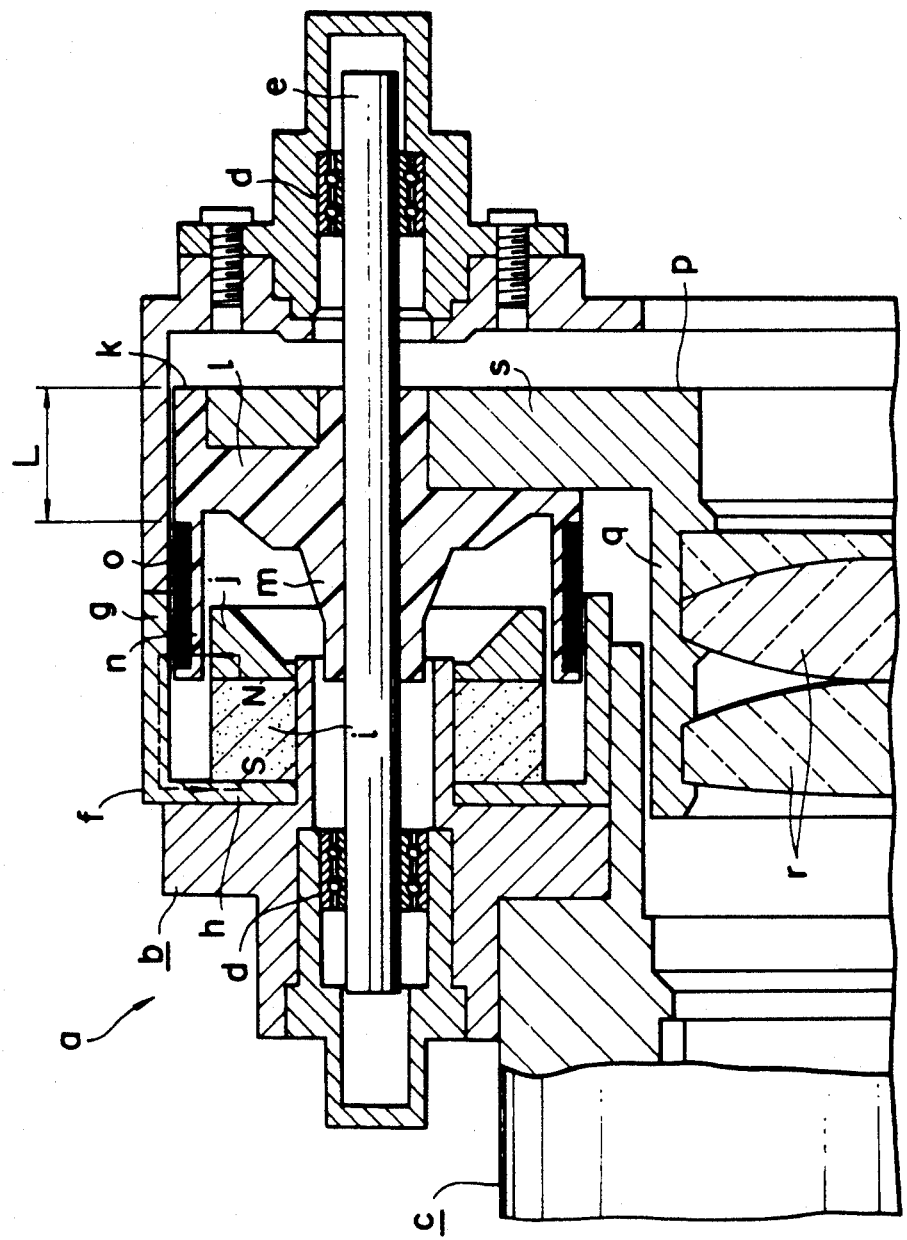
FIG. 7 is an axial vertical sectional view showing an exemplary conventional voice coil type actuator.

Referring now to FIGS. 5 and 6, there is shown a voice coil type actuator according to a second embodiment of the present invention. The voice coil type actuator of the present embodiment is a modification to and is only different from the voice coil type actuator of the first embodiment described hereinabove in that magnets and an outside yoke are different in profile. Thus, like parts or elements are denoted by like reference numerals, and overlapping descriptions will be omitted herein to avoid redundancy.

In particular, the magnets denoted at 29 and 29' are each of a ring shape. The diameters of central holes 29a and 29'a in the magnets 29 and 29' are equal to the outer diameter of the guide shaft 14, and the magnets 29 and 29' are magnetized such that they each have their opposite magnetic poles lying in a radial direction thereof, that is, each of the magnets have an N (north) pole on the outer peripheral face side and an S (south) pole on the inner peripheral face side.

Meanwhile, the outside yoke denoted at 30 has a pair of annular portions 31a and 31b positioned on the opposite front and rear ends thereof and an intermediate portion 32 interconnecting the annular portions 31a and 31b. The intermediate portion 32 is of a substantially tubular shape having a recess 33 which is partially cut away in a circumferential direction.

The outside yoke 30 is divided into two forward and backward parts. In particular, the intermediate portion 32 is divided at the center thereof into a front side intermediate portion 32a and a rear side intermediate portion 32b, and the front side intermediate portion 32a and the front side annular portion 31a are formed as a unitary member from a material having a high permeability to form a front yoke body 30a while the rear side intermediate portion 32b and the rear side annular portion 31b are formed as another unitary member to form a rear yoke body 30b. Then, when the outside yoke 30 is to be assembled to a lens barrel, the front and rear yoke bodies 30a and 30b are joined together to form the outside yoke 30. The ease of assembly is improved by forming the outside yoke body 30 into the two front and rear parts in this manner.

The magnets 29 and 29' are outwardly fitted on and secured to the opposite front and rear ends of the guide shaft 14 while the annular portions 31a and 31b of the outside yoke 30 are outwardly fitted on and secured to the magnets 29 and 29'.

The connecting portion 22 of the movable body 13 is positioned such that it extends through the recess, or opening, 33 of the outside yoke 30.

In the present embodiment, since the magnets 29 and 29' do not have any recess and are each formed in a ring shape, leakage magnetic fluxes are reduced compared with those of the first embodiment, and the influence thereof upon a magnetic detecting element (Hall effect element 28) and so forth located nearby is decreased. On the other hand, higher magnetic fluxes flow along a closed magnetic path as leakage magnetic fluxes are decreased, and consequently, a great thrust can be obtained.

It is to be noted that, while in the embodiments described above a central portion of the guide shaft is made of a material having a high permeability and the remaining portion of the guide shaft is made of a metal material having a permeability and a high sliding performance with respect to the movable body, such construction of the guide shaft is effective to assure smooth movement of the movable body on the guide shaft. However, the entirety of the guide shaft in a radial direction in cross section may otherwise be made of a material having a high permeability.

It is also to be noted that, while in the embodiments described above the present invention is applied to a voice coil type actuator for moving a movable lens of a lens system of a camera, the application of the present invention is not restricted to such specific application and the present invention may be applied to any voice coil type actuator for moving a movable member of any type along a linear path.

Having now fully described the invention, it will be apparent to one of ordinary skill in the art that many changes and modifications can be made thereto without departing from the spirit and scope of the invention as set forth herein.

I claim:

1. A voice coil type actuator for linearly moving a movable member, comprising:
    a fixed guide shaft having at least a part of a cross section of said guide shaft being of a material having a permeability, said guide shaft having opposite end portions;
    a movable body supported for axial sliding movement on said guide shaft, said movable body having a portion supporting the movable member;
    a movable coil supported in a coaxial relationship relative to said guide shaft on said movable body;
    a yoke of a substantially cylindrical shape and surrounding a range of movement of said movable coil, said yoke having a recess formed therein extending in an axial direction of said yoke, said portion of said movable body that supports the movable member extending laterally through said recess; and
    a pair of fixed magnets disposed adjacent the opposite end portions of said guide shaft in contact with said guide shaft and said yoke and magnetized with opposite polarities in a direction perpendicular to an axis of said movable coil.

2. A voice coil type actuator according to claim 1, wherein said pair of fixed magnets are ring shaped and are magnetized with the opposite polarities in a radial direction thereof, and inner peripheral faces of said pair of fixed magnets being in contact with said guide shaft while outer peripheral faces of said pair of fixed magnets are in contact with said yoke.

3. A voice coil type actuator according to claim 1, wherein said guide shaft has a first portion made of a high permeability material and extending along an axis of said guide shaft and a second portion fitted on an outer periphery of said first portion.

4. A voice coil type actuator according to claim 3, wherein said second portion of said guide shaft is of a metal having a permeability and presenting a high sliding performance with respect to said movable body.

5. A voice coil type actuator according to claim 1, wherein said recess extends over an angle of about 90 degrees centered at an axis of said guide shaft.

6. A voice coil type actuator according to claim 1, wherein each magnet of said pair of fixed magnets has a recess similar to said recess of said yoke.

7. A voice coil type actuator according to claim 1, wherein said yoke comprises two parts which are divided in an axial direction of said yoke and to which said pair of fixed magnets are individually secured.

8. A voice coil type actuator according to claim 1, wherein an entirety of said guide shaft is of a material having a permeability.

* * * * *